US 6,688,284 B2

(12) United States Patent
Inoue

(10) Patent No.: US 6,688,284 B2
(45) Date of Patent: Feb. 10, 2004

(54) THROTTLE CONTROLLER

(75) Inventor: Jun-ichi Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 97 days.

(21) Appl. No.: 09/996,582

(22) Filed: Nov. 30, 2001

(65) Prior Publication Data
US 2002/0193205 A1 Dec. 19, 2002

(30) Foreign Application Priority Data
Jun. 13, 2001 (JP) ........................................ 2001-178807

(51) Int. Cl.⁷ ................................................ F02D 9/00
(52) U.S. Cl. ................... 123/399; 701/110; 123/339.17
(58) Field of Search ................................ 123/399, 361, 123/339.17; 701/110, 115, 103; 477/111; 62/172, 228.1, 228.4

(56) References Cited

U.S. PATENT DOCUMENTS

| 4,819,596 | A | * | 4/1989 | Yasuoka et al. | ............ 477/111 |
| 4,877,002 | A | * | 10/1989 | Shimomura et al. | ... 123/339.21 |
| 5,360,381 | A | * | 11/1994 | Swist | ......................... 477/175 |
| 5,975,049 | A | * | 11/1999 | Kawasaki | .............. 123/339.12 |
| 6,006,724 | A | * | 12/1999 | Takahashi et al. | ..... 123/339.19 |
| 6,050,238 | A | * | 4/2000 | Suzuki et al. | ................ 123/295 |
| 6,073,509 | A | * | 6/2000 | Salecker et al. | ............... 74/335 |
| 6,155,230 | A | * | 12/2000 | Iwano et al. | ........... 123/339.16 |

FOREIGN PATENT DOCUMENTS

| JP | 60-8436 | 1/1985 |
| JP | 63-57850 | 3/1988 |

* cited by examiner

Primary Examiner—Henry C. Yuen
Assistant Examiner—Hai Huynh
(74) Attorney, Agent, or Firm—Sughrue Mion, PLLC

(57) ABSTRACT

A throttle controller is provided which can control an engine revolution into the target engine revolution without being influenced by a load of an air conditioner compressor during speed change to provide smooth speed change at all times.

The throttle controller for controlling the engine revolution during speed change in a vehicle equipped with an automatic transmission includes a speed change controller for making instruction to control the target engine revolution during speed change, a detection unit for detecting the ON/OFF state of the air conditioner compressor, an electronic controller for calculating and outputting a target throttle opening degree corresponding to the target engine revolution based on the outputs from both the speed change controller and the detecting unit, and a motor controller for controlling a throttle drive motor based on an output from the electronic controller.

4 Claims, 2 Drawing Sheets

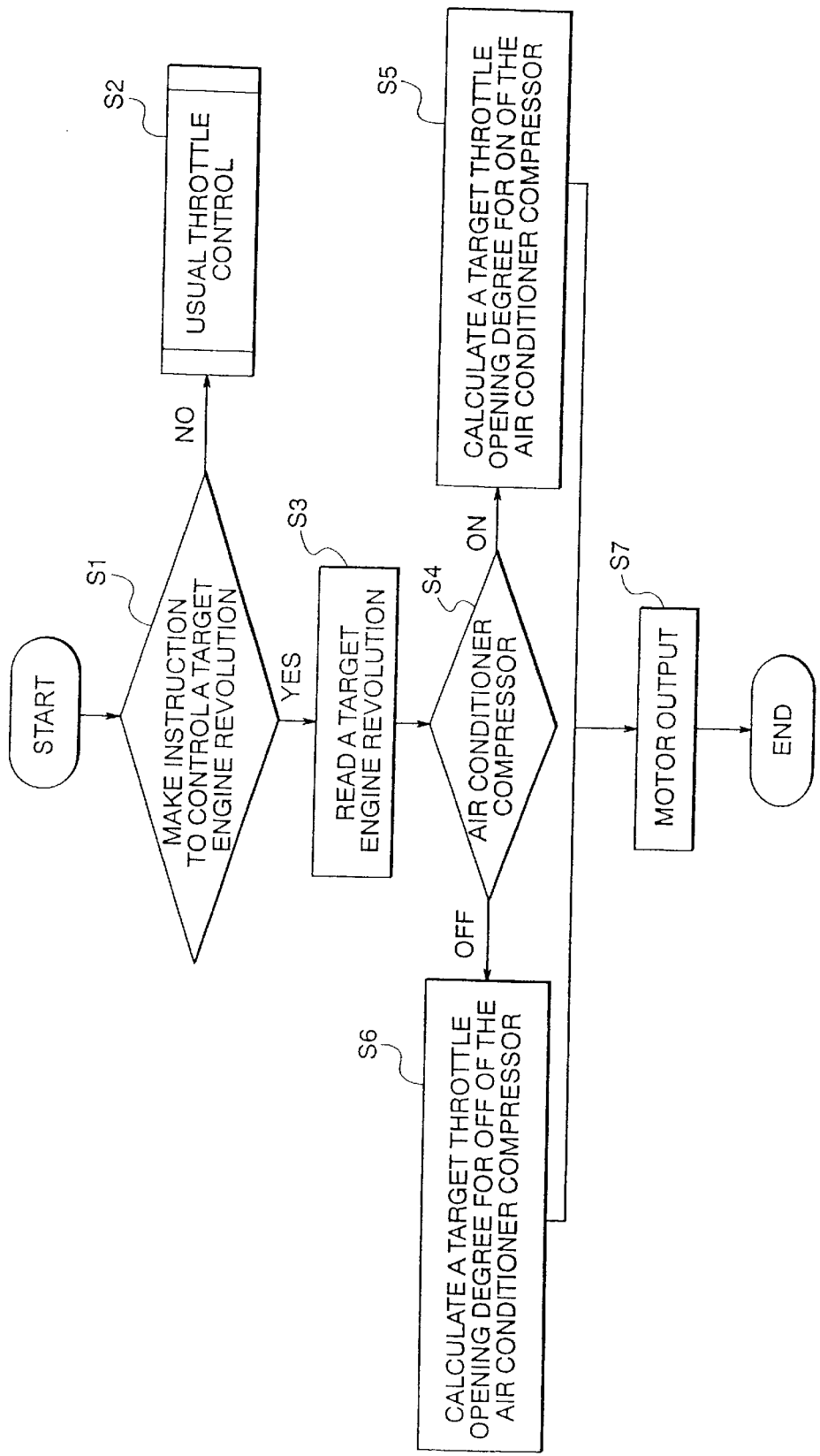

THROTTLE CONTROLLER

BACKGROUND OF THE INVENTION

1. Field of the Invention

The present invention relates to a throttle controller for controlling the engine revolution during speed change, in a vehicle equipped with an automatic transmission and an air compressor.

2. Description of the Prior Art

Generally, in vehicles equipped with an automatic clutch and a transmission, data is stored, for example, showing the relationship between the engine revolution and the throttle opening degree in the declutched state, and the throttle opening degree corresponding to the target engine revolution after speed change is outputted during gear shift where the clutch is declutched, thereby varying speed smoothly.

BRIEF SUMMARY OF THE INVENTION

Object of the Invention

However, in conventional devices as described above, there is a problem that when a load is applied to the engine due to operation of the air conditioner compressor even in the declutched state, the actual engine revolution can not reach the target engine revolution with only setting of the target throttle opening degree for a target engine revolution in the declutched state, resulting in an increased shock in gear change.

The present invention is made to solve the problem described above and an object of the present invention is to provide a throttle controller which can control an engine revolution to the target engine revolution smoothly without being influenced by the ON/OFF state of the air conditioner compressor.

SUMMARY OF THE INVENTION

A throttle controller according to claim 1 of the present invention is a throttle controller for controlling the engine revolution during speed change in an vehicle equipped with an automatic transmission wherein the throttle controller includes:

speed change control means for making instruction to control the target engine revolution during speed change;

detection means for detecting the ON/OFF state of the air conditioner compressor, throttle opening degree calculation means for calculating the target throttle opening degree corresponding to the target engine revolution based on the outputs from both the above speed change control means and the above detection means and outputting it; and motor control means for controlling a throttle drive motor based on the output of the throttle opening degree calculation means.

The throttle controller according to claim 2 of the present invention is a throttle controller according to claim 1 wherein the throttle opening degree calculation means calculates the target throttle opening degree for a target engine revolution based on a map in which setting is done depending on the ON/OFF state of the air conditioner compressor.

The throttle controller according to claim 3 is a throttle controller according to claim 1 or 2 wherein the speed change control means has a memory in which the target engine revolution is set depending on the conditions during speed change, and the throttle opening calculation means reads out the corresponding target engine revolution from the memory based on the instruction by the speed change control means.

The throttle controller according to claim 4 is a throttle controller according to claim 3 wherein the target engine revolution depending on the conditions during speed change is the target engine revolution in the declutched state.

BRIEF DESCRIPTION OF THE DRAWINGS

FIG. 3 is a flow chart illustrating the operation of the first embodiment of the present invention.

DETAILED DESCRIPTION OF THE PREFERRED EMBODIMENTS

Now, embodiments will be described with reference to the drawings.

First Embodiment

Figure 1:
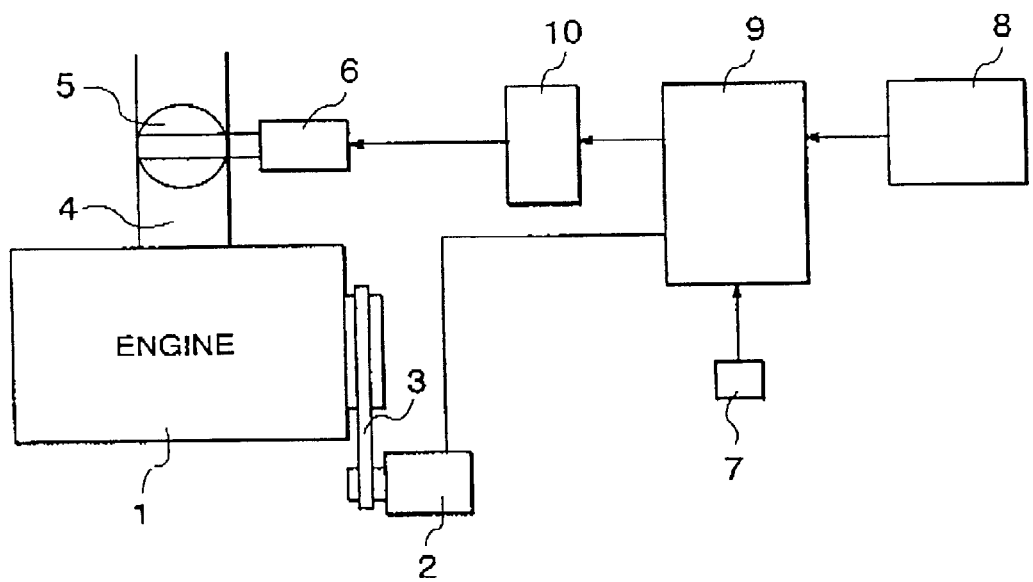
FIG. 1 is a block diagram showing a throttle controller according to a first embodiment of the present invention.

FIG. 1 is a block diagram showing a throttle controller according to a first embodiment of the present invention.

In the figure, reference numeral 1 denotes an engine; reference numeral 2 an air conditioner compressor: reference numeral 3 an air conditioner belt for transmitting a driving power of the engine to the air conditioner compressor; reference numeral 4 an inlet pipe; reference 5 a throttle; reference 6 a throttle drive motor. Reference numeral 7 denotes an air conditioner switch connected to the air conditioner compressor 2 for outputting a signal for determining the ON/OFF state. Reference numeral 8 denotes a speed change controller as speed change control means for controlling a transmission for outputting an instruction to control the target engine revolution in the declutched state of the clutch (not shown). The speed change controller 8 also has a memory (not shown) in which the target engine revolution is preset depending to the conditions during speed change.

Reference numeral 9 denotes an electronic controller as throttle opening degree calculation means for determining the ON/OFF state of the air conditioner compressor 2 based on the signal sent from the air conditioner switch 7, calculating a throttle opening degree corresponding to the target engine revolution indicated by the speed change controller 8, and outputting a throttle opening instruction. Reference numeral 10 denotes a motor controller as motor control means for receiving the throttle opening instruction front the electronic controller 9, and controlling the throttle drive motor 6. The electronic controller 9 also includes detection means (not shown) for detecting the ON/OFF state of the air conditioner compressor 2 based on the signal front the air conditioner switch 7 for determining the ON/OF state of the air conditioner compressor.

Figure 2:
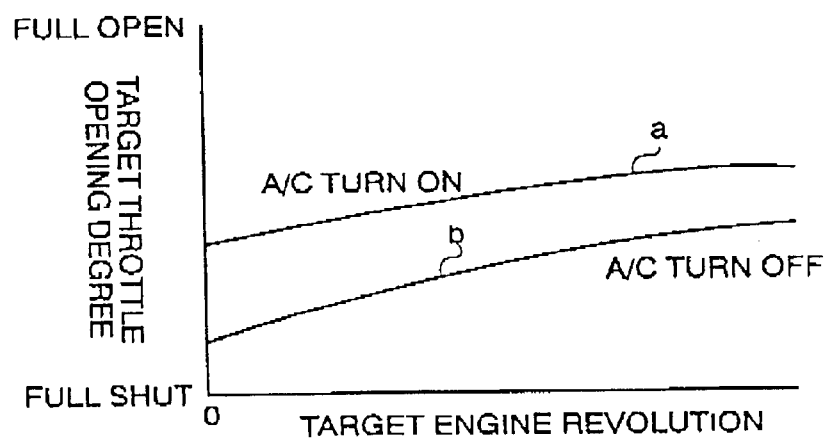
FIG. 2 is a timing chart illustrating the operation of the first embodiment of the present invention.

FIG. 2 shows a plot of the target throttle opening degree versus the target engine revolution in both turning on and off of the air conditioner compressor (A/C).

In this embodiment, as described below, the ON/OFF state of the air conditioner compressor is detected and a target throttle opening degree for a target engine revolution is determined with a characteristic map substantially as shown FIG. 2 separately set based on the ON/OFF state of the air conditioner compressor.

Next, the operation of the electronic controller 9 will be described according to the flow chart of FIG. 3 referring also to FIG. 2.

First, it is determined whether an indication is made by the speed change controller 8 to control the target engine revolution outputted according to the state of the clutch (Step S1). If not, that is, in the clutched state, conventional throttle control is performed (step S2), and if an indication is made to control the target engine revolution, that is, in the declutched state, the target engine revolution is read in from the speed change controller 8 (step S3).

Then, the drive state of the air conditioner compressor 2 is determined based on the signal from the air conditioner switch 7 for determining the ON/OFF state of the air conditioner compressor (step S4). When the state of the air conditioner compressor 2 is ON, a target throttle opening degree corresponding to the target engine revolution is determined with the data on the ON state of the air conditioner compressor (step S5), and when the state of the air conditioner compressor 2 is OFF, the target throttle opening degree corresponding to the target engine revolution is determined with the data on the OFF state of the air conditioner compressor (step S6). In other words, in step S5, characteristic a as shown in FIG. 2 is used to determine the target throttle opening degree corresponding to the target engine revolution in the ON state of the air conditioner compressor 2, and in step S6, characteristic b as shown in FIG. 2 is used to determine the target throttle opening degree corresponding to the target engine revolution in the OFF state of the air conditioner compressor 2.

In either case, an throttle opening instruction depending on the throttle opening degree calculated is outputted to the motor controller 10 (step S7). And, the motor controller 10 controls the motor 6 to drive the throttle 5.

In this way, in this embodiment, the ON/OFF state of the air conditioner compressor is detected and the target throttle opening degree for a target engine revolution is determined with the map separately set according to the ON/OFF state of the air conditioner compressor and outputted so that the engine revolution can be controlled to the target engine revolution without being influenced by the load in the declutched state thereby varying speed smoothly at all times.

The above described embodiment is described for the case where the speed change controller 8 and the motor controller 10 are configured separately from the electronic controller 9, but they may be configured integrally with the electronic controller 9 to obtain the same effect.

As shown above, according to the present invention, the engine revolution can be controlled to the target engine revolution without being influenced by the load of the air conditioner compressor during speed change. This configuration makes it possible to vary speed smoothly at all times.

What is claimed is:

1. A throttle controller for controlling the engine revolution during speed change in a vehicle equipped with an automatic transmission comprising:

speed change control means for making instruction to control the target engine revolution during speed change;

detection means for detecting the ON/OFF state of an air conditioner compressor;

throttle opening degree calculation means for calculating the target throttle opening degree corresponding to said target engine revolution based on the outputs from both the speed change control means and the detection means and outputting it; and, motor control means for controlling a throttle drive motor based on the output of the throttle opening degree calculation means.

2. The throttle controller according to claim 1, wherein said throttle opening degree calculation means calculates the target throttle opening degree for a target engine revolution with a map in which setting is done depending on the ON/OFF state of said air conditioner compressor.

3. The throttle controller according to claim 1, wherein said speed change control means has a memory in which the target engine revolution is set depending on the conditions during speed change, and said throttle opening degree calculation means reads out the corresponding target engine revolution from said memory based on the instruction by said speed change control means.

4. The throttle controller according to claim 3, wherein said target engine revolution depending on the conditions during speed change is the target engine revolution in the declutched state.

\* \* \* \* \*